United States Patent Office 3,270,087
Patented August 30, 1966

3,270,087
HYDROGENATION PROCESS
Richard F. Heck, McDaniel Crest, Wilmington, Del., assignor to Hercules Powder Company, Wilmington, Del., a corporation of Delaware
No Drawing. Filed June 16, 1964, Ser. No. 375,651
8 Claims. (Cl. 260—683.9)

This invention relates to a homogeneous system for the catalytic hydrogenation of α-olefins. More particularly the invention relates to a process for the hydrogenation of α-olefins in the presence of a catalyst which is soluble in the reaction medium.

Catalytic hydrogenation of unsaturated hydrocarbons is known in the art. For the most part the known hydrogenations occur in the presence of a catalyst which is insoluble in the reaction medium. This type of system is susceptible to catalyst poisoning and, furthermore, generally requires utilization of high hydrogen pressures and high temperatures. Recently a hydrogenation process was described which overcame these disadvantages. That process is the subject of U.S. 3,113,986 to David S. Breslow and Albert S. Matlack.

Now in accordance with this invention, it has been found that α-olefins may be hydrogenated in a homogenous system under relatively low hydrogen pressure by means of a catalyst prepared by the reaction of an alkali metal borohydride with a compound of the formula:

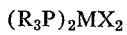

wherein any one of the R's is selected from the group consisting of alkyl and aryl groups, M is a metal selected from the group consisting of cobalt, nickel and palladium, and X is a halogen selected from the group consisting of chlorine, bromine and iodine. The catalytically active reaction products are soluble in the hydrogenation reaction mixture.

Any alkali metal borohydride may be used as one component in producing the catalysts used in accordance with this invention. Exemplary of such compounds are sodium borohydride, potassium borohydride and lithium borohydride.

As the other component used in producing the catalysts of this invention, compounds of the formula:

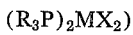

wherein any one of the R's is selected from the group consisting of alkyl and aryl groups, M is a metal selected from the group consisting of cobalt, nickel and palladium, and X is a halogen selected from the group consisting of chlorine, bromine and iodine. Exemplary of such compounds are bis(tri-n-butylphosphine) palladium dichloride, bis(tri-n-butylphosphine) cobalt dichloride, bis(tri-n-butylphosphine) nickel dichloride, bistriphenylphosphine) cobalt dichloride, bis(triphenylphosphine) nickel dibromide, bis(trimethylphosphine) nickel dichloride, bis-triethylphosphine) cobalt dibromide, bis(tri-n-propylphosphine) palladium dichloride, bis(tri - p - methoxyphenylphosphine) cobalt dibromide, bis(tri-p-tolylphosphine) nickel dichloride, bis(methyldiethylphosphine) nickel dibromide and bis(dimethylphenylphosphine) cobalt dichloride.

The following examples will illustrate the hydrogenation process of this invention. All parts and percentages are by weight unless otherwise indicated.

Example 1

A reaction vessel was flushed with hydrogen and charged with 68.4 parts of heptane and 20 parts of octene-1. Two parts of bis(tri-n-butylphosphine) palladium dichloride and 0.130 part of sodium borohydride in 47.3 parts of diethylene glycol dimethyl ether was then added as catalyst. The vessel was then pressurized to 40 p.s.i.g. with hydrogen and agitated for 16 hours at 25° C. At the end of this time the pressure had dropped from 40 p.s.i.g. to 30 p.s.i.g. The vessel was then vented and the product was recovered from the reaction mixture by distillation. Mass special analysis of the solution showed that 35% of the octene had been reduced to n-octane.

Example 2

Example 1 was repeated except that 15 parts of hexene-1 were used in place of octene-1. At the end of the reaction, analysis of the product showed that the hexene-1 had been reduced to n-hexane.

Example 3

A reaction vessel was charged with 1.0 part of bis(triphenylphosphine) cobalt dichloride and flushed with hydrogen. Then 132.4 parts of diethylene glycol dimethyl ether and 21.3 parts of octene-1 were added followed by 0.2 part sodium borohydride in 9.45 parts of diethylene glycol dimethyl ether. The vessel was pressurized to 40 p.s.i.g. with hydrogen and then agitated for 19 hours at 25° C., and at the end of this time the pressure had dropped from 40 p.s.i.g. to 20 p.s.i.g. The vessel was then vented and the product was recovered from the reaction mixture by distillation. Product analysis showed a 70% conversion of the octene-1 to n-octane.

Example 4

A reaction vessel was charged with 10 parts of bis(tri-n-butylphosphine) nickel dichloride and 1.0 part of sodium borohydride. The vessel was then flushed with hydrogen and charged with 472.5 parts of cold diethylene glycol dimethyl ether. The resulting solution was agitated at 0° C. until the color changed from red to brown. Then in a hydrogen atomsphere the product was extracted into 342 parts of heptane. The heptane solution was washed thoroughly with water to remove the diethylene glycol dimethyl ether and unreacted sodium borohydride, dried over magnesium sufate, filtered and maintained under a hydrogen atmosphere at 0° C.

Example 5

A vessel containing a hydrogen atmosphere was charged with 21.3 parts of octene-1, 82 parts of heptane and 34.2 parts of the catalyst solution prepared in the preceding example. The vessel was then pressurized to 30 p.s.i.g. with hydrogen and agitated at 50° C. for 21 hours. At the end of this time the pressure had dropped 25 p.s.i.g. Analysis of the final product showed an 88% yield of n-octane.

Example 6

Following the general procedure described in Example 5, 13.5 parts of hexene-1 was reduced in 103 parts of heptane and 15.8 parts of acetone using as the catalyst 46 parts of the catalyst solution prepared in Example 4. The reduction was carried out at room temperature for 24 hours. At the end of the 24-hour reaction period the product was separated and it was found that 63% of the hexene-1 had been reduced to n-hexane.

Example 7

A catalyst solution in 342 parts of heptane was prepared from 1.0 part of sodium borohydride and 10 parts of bis(tri-n-butylphosphine) palladium dichloride following the procedure of Example 4. Thirty-four and two-tenths parts of this solution was charged to a vessel along with 21.3 parts of octene-1 and 103 parts of heptane. The vessel was pressurized to 40 p.s.i.g. with hydrogen and agitated at 40 to 50° C. for 20 hours. Separation and analysis of the product showed a qualitative reduction of the octene-1 to n-octane.

Example 8

Example 6 was repeated except that 46.2 parts of the catalyst solution prepared in Example 7 was used instead of the catalyst solution used in Example 6. After 24 hours the pressure had dropped 15 p.s.i.g. It was found that 63% of the hexene-1 had been reduced to hexane.

Example 9

A vessel containing a hydrogen atmosphere was charged with 2 parts of bis(tri-n-butylphosphine) palladium dichloride, 0.130 part of sodium borohydride and 1 part of diethylene glycol dimethyl ether. Twenty parts of octene-1 was added, and the vessel was pressurized to 40 p.s.i.g. with hydrogen and then agitated for 18 hours at 30° C. At the end of this time the pressure had dropped from 40 p.s.i.g. to 20 p.s.i.g. The vessel was vented and the catalyst removed from the product by distillation. Product analysis showed a 75% conversion of octene-1 to n-octane.

The reaction of the alkali metal borohydride with the bis(tri-substituted phosphine) metal halide may be carried out in situ by adding either one of the catalyst components to the reactor at the beginning of the reaction and the second catalyst component then added continuously or incrementally during the reaction, or both catalyst components may be added either continuously or incrementally throughout the hydrogenation reaction. The catalyst components may be prereacted and used for the hydrogenation reaction if this prereaction is carried out under hydrogen or nitrogen. In all cases, the exclusion of oxygen is necessary.

The alkali metal borohydride and the bis(tri-substituted phosphine) metal halide are generally used in a molar ratio of from about 0.10 to 10, preferably from about 0.25 to about 1. The exact ratio used and the amount of catalyst used for the hydrogenation reaction may be varied over a wide range and will depend somewhat upon the hydrogenation conditions, the compound that is being hydrogenated, and the particular catalyst selected. Generally, the amount of catalyst will be from about 0.01% to about 10%, based on the weight of the olefin, preferably from about 0.1% to about 5%.

Any α-olefin containing from 2 to 50 carbon atoms may be reduced by the process of this invention. Exemplary of these olefins are butene-1, hexene-1, heptene-1, octene-1, and dodecene-1.

The process of this invention is useful for the selective hydrogenation of α-olefins in feed stocks containing mixtures of α-olefins and aromatic hydrocarbons. By hydrogenating these mixtures using the subject process, the α-olefins may be reduced to their less-reactive saturated hydrocarbons while the aromatics are not affected. Thereafter, since the reactivity of the olefinic component has been substantially reduced, the remaining aromatics may be treated with several functional reagents. Utilization of this process avoids the necessity of separating the olefinic component from the aromatic components prior to the desired reaction.

The hydrogenation reaction of this invention is preferably carried out in an inert diluent in which the catalyst and α-olefin are soluble. Exemplary of such diluents are cycloaliphatic, aliphatic and aromatic hydrocarbons and halogenated hydrocarbons such as heptane, octane, cyclohexane, benzene, toluene, and chlorobenzene; ethers such as diethylene glycol, dimethylether, dioxane, tetrahydrofuran, and ethylene glycol dimethylether; ketones such as acetone, methyl ethyl ketone and methyl isobutyl ketone; and alcohols such as ethanol, methanol, and isopropanol.

It is also possible to carry out the hydrogenation reaction of this invention in the absence of an inert diluent. In so doing, however, it is preferred to preform the catalyst in a small amount of diluent. It is also necessary to insure that the catalyst components are soluble in the reaction medium, i.e., both catalyst components should be soluble in the liquid α-olefin which is to be reduced.

To avoid or reduce any polymerization of α-olefin by the catalysts of this invention, the hydrogen is introduced into the system prior to the formation of the catalyst or along with the prereacted catalyst. Thus, if the catalyst components are prereacted under hydrogen, this mixture may then be added to the hydrogenation system or the α-olefin may be added to it. If the catalyst components are reacted in situ, the hydrogen is introduced prior to the addition of at least one of the catalyst components or prior to the addition of the α-olefin.

Nitrogen may also be used as the inert atmosphere in the preparation of the catalysts of this invention. If the catalyst components are prereacted under nitrogen, the catalyst product may be extracted into a hydrocarbon such as heptane and this solution may then be added to a hydrogenation system or it may be maintained at about 0° C. under a nitrogen atmosphere. If the catalyst components are reacted in situ, it will be more convenient to use hydrogen as the inert atmosphere since it may then also be used for hydrogenation. However, nitrogen may be used in the same manner as hydrogen. The nitrogen will, however, be vented prior to the addition of the hydrogen.

In a continuous operation, and particularly in the case of gaseous hydrocarbons, the addition of the hydrogen is most readily accomplished by charging a mixed stream of olefin and hydrogen. Because of the homogeneity of the system and of the high activity of these hydrogenation catalysts, relatively low hydrogen pressures are required. Thus, the process may be operated under only a few pounds of hydrogen, and in fact, at least less than one atmosphere if desired, but pressures up to as high as 5000 p.s.i. may be used if desired. In the same way, relatively low temperatures are required for the catalytic hydrogenation of this invention. Generally, the process will be carried out at a temperature of from about −50° C. to about 100° C. and preferably from about 25° C. to about 100° C.

The process of this invention offers many advantages over the hydrogenation processes of the prior art. The catalysts of this process are stable to water, thus there is no need to utilize only totally anhydrous solvents and substrates in the hydrogenation process. Moreover, the catalysts may be used in the presence of several inert diluents as solvent which would normally destroy the prior art catalysts. This is because no reaction occurs between the catalysts of this invention and functional groups which are present in several solvents, i.e., aldehydes, ketones, and alkyl chlorides. Moreover, the catalysts used in this process are not readily poisoned so that exhaustive purification prior to the reduction process is not required as in many of the prior art processes. Frequently much lower catalyst levels can be used. The ability to operate at low pressure effects substantial economies in equipment costs. Since the process can be operated at much lower temperatures than previously used, less by-products are formed since side reactions such as hydrogenolysis are minimized.

What I claim and desire to protect by Letters Patent is:

1. A process for the catalytic hydrogenation of an α-olefin in a homogeneous reaction medium which comprises contacting the α-olefin with hydrogen in the presence of a catalyst formed by the reaction of an alkali metal borohydride with a compound of the formula $(R_3P)_2MX_2$ wherein any of the R's is selected from the group consisting of alkyl and aryl groups, M is a metal selected from the group consisting of cobalt, nickel and palladium, and X is a halogen selected from the group consisting of chlorine, bromine and iodine.

2. The process of claim 1 wherein the alkali metal borohydride is sodium borohydride.

3. The process of claim 1 wherein the compound of the formula $(R_3P)_2MX_2$ is bis(tri-n-butylphosphine) nickel dichloride.

4. The process of claim 1 wherein the compound of the formula $(R_3P)_2MX_2$ is bis(tri-n-butylphosphine) cobalt dichloride.

5. The process of claim 1 wherein the compound of the formula $(R_3P)_2MX_2$ is bis(tri-n-butylphosphine) palladium dichloride.

6. The process of claim 1 wherein the compound of the formula $(R_3P)_2MX_2$ is bis(triphenylphosphine) cobalt dichloride.

7. The process of claim 1 wherein the α-olefin is hexene-1.

8. The process of claim 1 wherein the α-olefin is octene-1.

References Cited by the Examiner

UNITED STATES PATENTS

| | | | |
|---|---|---|---|
| 3,014,025 | 12/1961 | Pearson et al. | 260—683.9 |
| 3,110,747 | 11/1963 | Mullineaux | 260—683.9 |
| 3,113,986 | 12/1963 | Breslow et al. | 260—683.9 |
| 3,130,237 | 4/1964 | Wald | 260—683.9 |
| 3,200,168 | 9/1965 | Kollonitsch | 260—683.9 |

DELBERT E. GANTZ, *Primary Examiner.*

S. P. JONES, *Assistant Examiner.*